(12) United States Patent
Dell

(10) Patent No.: US 6,745,944 B2
(45) Date of Patent: Jun. 8, 2004

(54) SYSTEM AND METHOD FOR IDENTIFYING APPLICATIONS LOADED IN A SMART CARD

(75) Inventor: Jason S. Dell, Richmond, VA (US)

(73) Assignee: Capital One Financial Corporation, Falls Church, VA (US)

( * ) Notice: Subject to any disclaimer, the term of this patent is extended or adjusted under 35 U.S.C. 154(b) by 0 days.

(21) Appl. No.: 09/885,611

(22) Filed: Jun. 20, 2001

(65) Prior Publication Data

US 2002/0195493 A1 Dec. 26, 2002

(51) Int. Cl.$^7$ ................................................ G06K 19/06
(52) U.S. Cl. ................................................ 235/492
(58) Field of Search ................................ 235/451, 492

(56) References Cited

U.S. PATENT DOCUMENTS

| | | | |
|---|---|---|---|
| 4,837,422 A | * 6/1989 | Dethloff et al. | 235/380 |
| 5,276,311 A | * 1/1994 | Hennige | |
| 5,530,232 A | 6/1996 | Taylor | |
| 5,530,235 A | * 6/1996 | Stefik et al. | 235/492 |
| 5,734,154 A | 3/1998 | Jachimowicz et al. | |
| 5,767,896 A | * 6/1998 | Nemirofsky | 348/13 |
| 5,777,903 A | 7/1998 | Piosenka et al. | |
| 5,880,769 A | * 3/1999 | Nemirofsky et al. | 348/12 |
| 5,884,271 A | * 3/1999 | Pitroda | 705/1 |
| 5,923,884 A | 7/1999 | Peyret et al. | |
| 5,955,961 A | * 9/1999 | Wallerstein | 340/825.33 |
| 6,024,286 A | 2/2000 | Bradley et al. | |
| 2001/0048024 A1 | 12/2001 | Yap et al. | |
| 2002/0059366 A1 | * 5/2002 | Yap | |

OTHER PUBLICATIONS

"Who owns the Desktop? Microsoft and the DOJ Battle for Control of the User Interface" by Andrew Leonard, Salon.com, http://archive.salon.com/21st/feature 1998/05/19/19featureb. 2000.*
"MS is NOT price gouging on Windows—DoJ expert" by Graham Lea, Jan. 18, 1999, http://www.theeregister.co.uk.*
"Farewell to FUD" by Mark Hall, Jul. 16, 2001, http://www.computerworld.com.*
Sorenson, Dustin, "Smart–Card Devices and Applications", Dell Computer Corporation, Jan. 2001, http://www.dell.com/us/en/gen/topics/vectors_2001–smartcard.htm.
Drobac, Stan, "Gemplus and Alien Technology to Develop Smart Card Displays Volume Production Agreement Signed", Alient Technology, Jul. 11, 2000.
Byte Magazine, "Where to Find", Jun. 1996. http://www.byte.com/art/9606/sec17/art4.htm.

* cited by examiner

Primary Examiner—Mark Tremblay
(74) Attorney, Agent, or Firm—Baker & McKenzie

(57) ABSTRACT

A smart card having a display is provided. The card is capable of storing application programs and displaying symbols or logos of the stored application programs to allow a user to view which applications are currently available in the smart card.

29 Claims, 4 Drawing Sheets

SYSTEM AND METHOD FOR IDENTIFYING APPLICATIONS LOADED IN A SMART CARD

FIELD OF THE INVENTION

The present invention is related to smart cards, and in particular, a smart card having a display for displaying currently loaded applications.

BACKGROUND OF THE INVENTION

As is well known, a smart card is a portable device, usually similar in size to a credit card, that contains a processing logic and memory for storing information. The smart card generally contains all the intelligence necessary to complete a transaction locally at the transaction location. Depending on the complexity of the smart cards, they offer virtually unlimited application possibilities. The applications may include such transactions as an electronic purse, prepaid telephone, highway toll collection, frequent flier mileage tracking, personal finance, and personal authentication. The smart card may also be used to store personal information, health care data or the like.

As the number of available applications grows, popularity of a smart card containing multiple applications is expected to increase substantially. Multi-application smart cards are known. For example, U.S. Pat. No. 5,530,232 issued to Taylor on Jun. 25, 1996 describes a multi-application smart card that uses multiple memory banks to store data related to the multiple applications.

However, the applicant of the present invention recognized that one of the problems in a wide-spread adoption of a multi-application smart card by the industry is that there is no easy way for a user to find out what applications reside in the card. The problem is compounded if the user holds two or more multi-application cards. One solution is to permanently print the symbols or logos of the applications on the card at the time of issuance. As can be appreciated, however, this solution is inadequate. Even though different applications may be loaded and removed from the card from time to time, the permanent printing of the logos cannot be changed to accurately reflect the currently loaded applications. Another solution is to use an external reader device that slips over the card to view the card's content. Such a device, however, is too bulky to carry around with the card.

Therefore, it can be appreciated that there is a need to provide a convenient system and method for identifying which applications are currently available in a multi-application smart card.

SUMMARY OF THE INVENTION

According to the principles of the present invention, there is provided a smart card that is capable of identifying the currently loaded application programs. The smart card includes a memory for storing application programs and their associated symbols or logos, and a processor capable of executing the stored programs. According to the invention, the smart card includes a display that can display the stored symbols of the loaded application programs for easy identification by the user.

As can be appreciated, the present invention provides the advantage of allowing a user to see which application programs are currently available at all times as different application programs are loaded and deleted from time to time.

To provide even more convenience for the user, in one embodiment, the processor displays the programs according to how frequently they are used by the user.

DETAILED DESCRIPTION OF THE INVENTION

Figure 1:
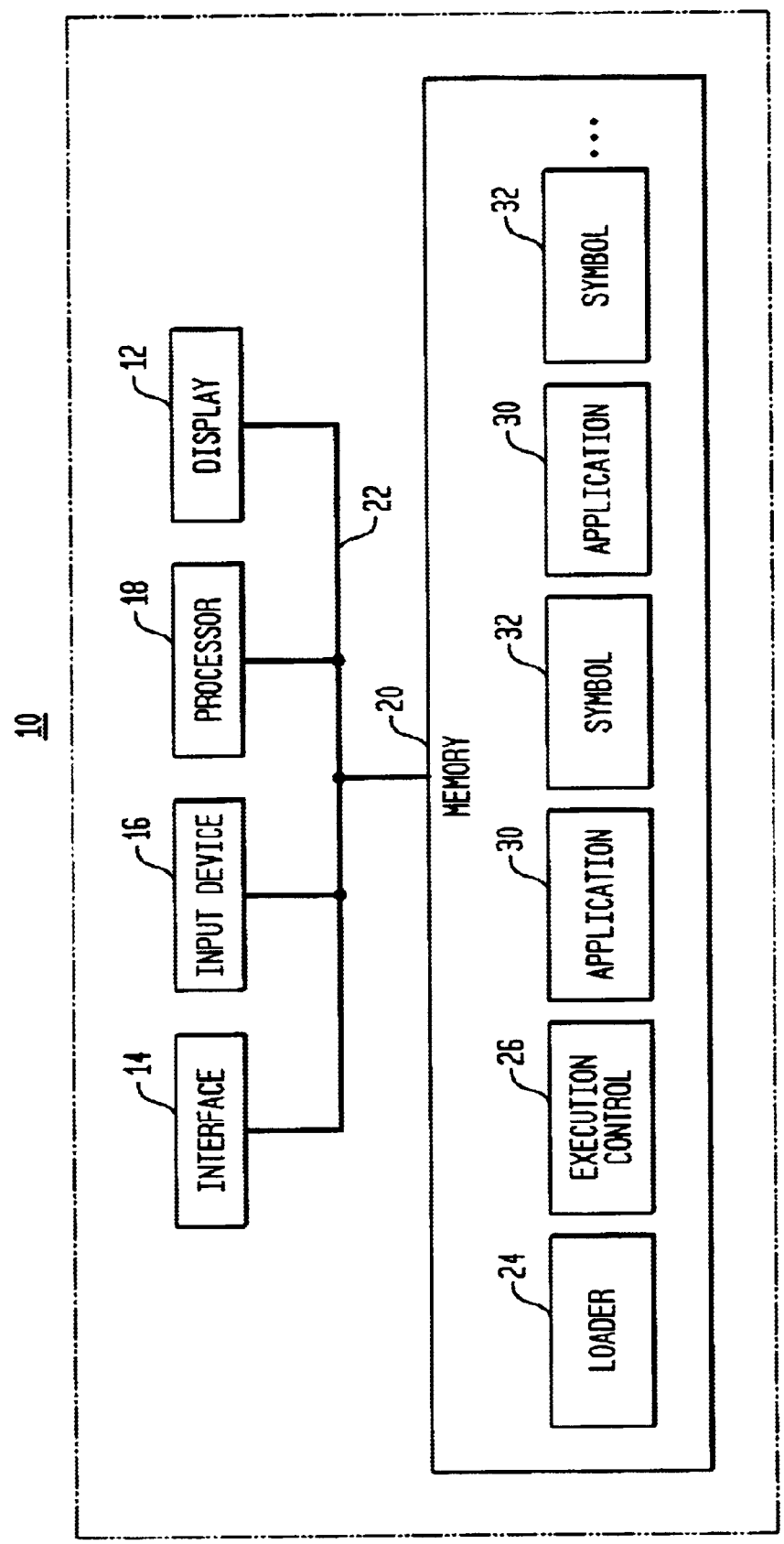
FIG. 1 is a block diagram of a smart card according to the present invention.
Figure 2:
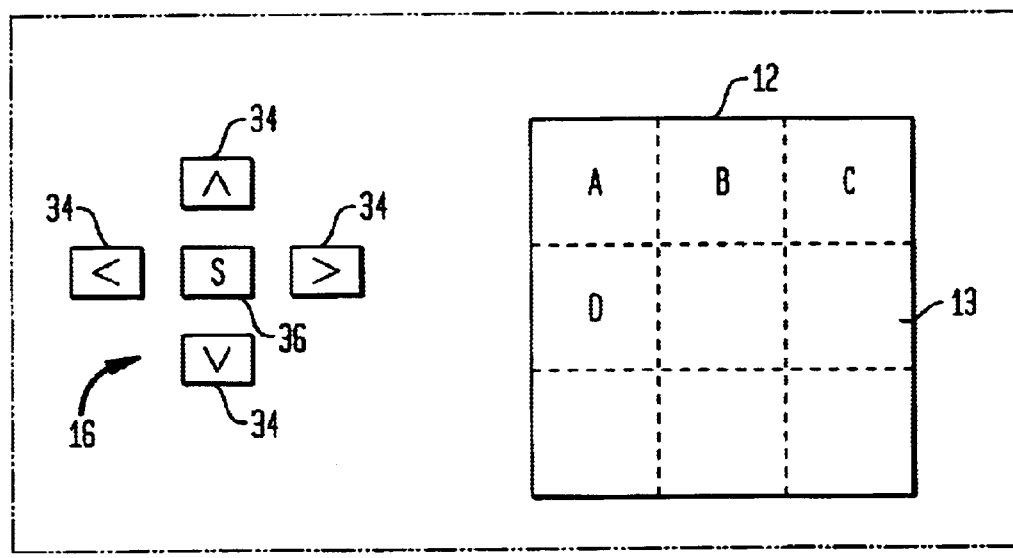
FIG. 2 illustrates an exterior side of the smart card.

FIG. 1 is a block diagram of a smart card 10 that is capable of displaying symbols or logos of loaded application programs according to the present invention. The smart card 10 includes an interface 14, input device 16, processor 18, display 12 integrated into the smart card housing and memory 20 which are all connected to a common bus 22. FIG. 2 illustrates an exterior side of the card 10.

The display 12 can be any display that are commonly used for portable devices. For example, the display 12 can be a liquid crystal display (LCD), electronic ink display (EID), light emitting display (LED), thin film transistor (TFT) display, field emission display (FED) or the like. In one embodiment, the display 12 is an LCD film of a bi-stable or multi-stable material such that it will maintain an image when power has been removed. In this way, the smart card 10 requires no internal power source to permanently display currently available application programs for viewing by the user.

The interface 14 transfers various data and control signals between the smart card 10 and an external system (not shown). The interface 14 may be contact-less such as an RF transceiver to transmit and receive data and control signals. Alternatively, the interface 14 may be contact based which requires the smart card 10 to come in contact with the external system. The external system may be a card reader, a point of sale system, automated teller machine, or the like.

The input device 16 may be a standard membrane key pad with directional keys 34 and a selection key 36. Alternatively, the device 16 can be a part of the display 12 such as a touch sensitive display that are commonly used in personal digital assistants (PDAs'). Still another alternative is a thumb wheel device or a voice recognition device found in certain cellular telephones. The input device 16 is used for navigating between application programs and selecting a particular program as will be explained in detail later herein.

In another embodiment, no input device may be present as the external system will automatically select a proper application to run.

Figure 3:
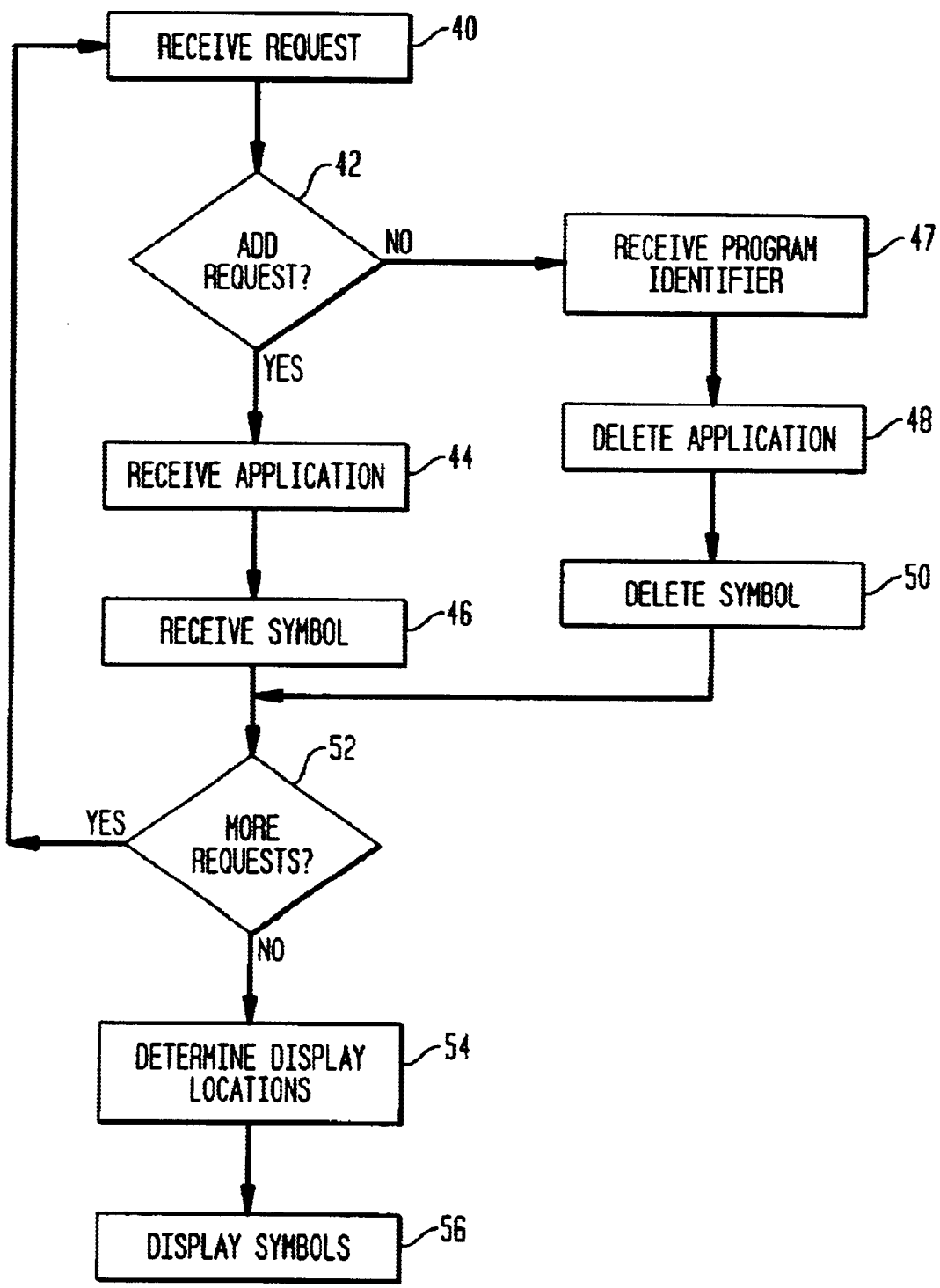
FIG. 3 is a flow diagram of a method for loading and removing application programs, and displaying associated symbols on a display of the smart card.

The memory 20 may contain many different types such as read only memory (ROM), random access memory (RAM), and non-volatile memory (NVM). The memory 20 stores programs that are executed by the processor 18. As shown in FIG. 1, the memory 20 stores a loader program 24, execution control program 26, and one or more application programs 30 and their associated symbols 32. The loader program 24 controls loading and removing of application programs 30 and associated application symbols from the smart card memory 20 as shown in FIG. 3. As part of the loading or removing process, the loader 24 may verify or authenticate that the external system desiring to load or remove an application program has the appropriate authority to do so.

Figure 4:
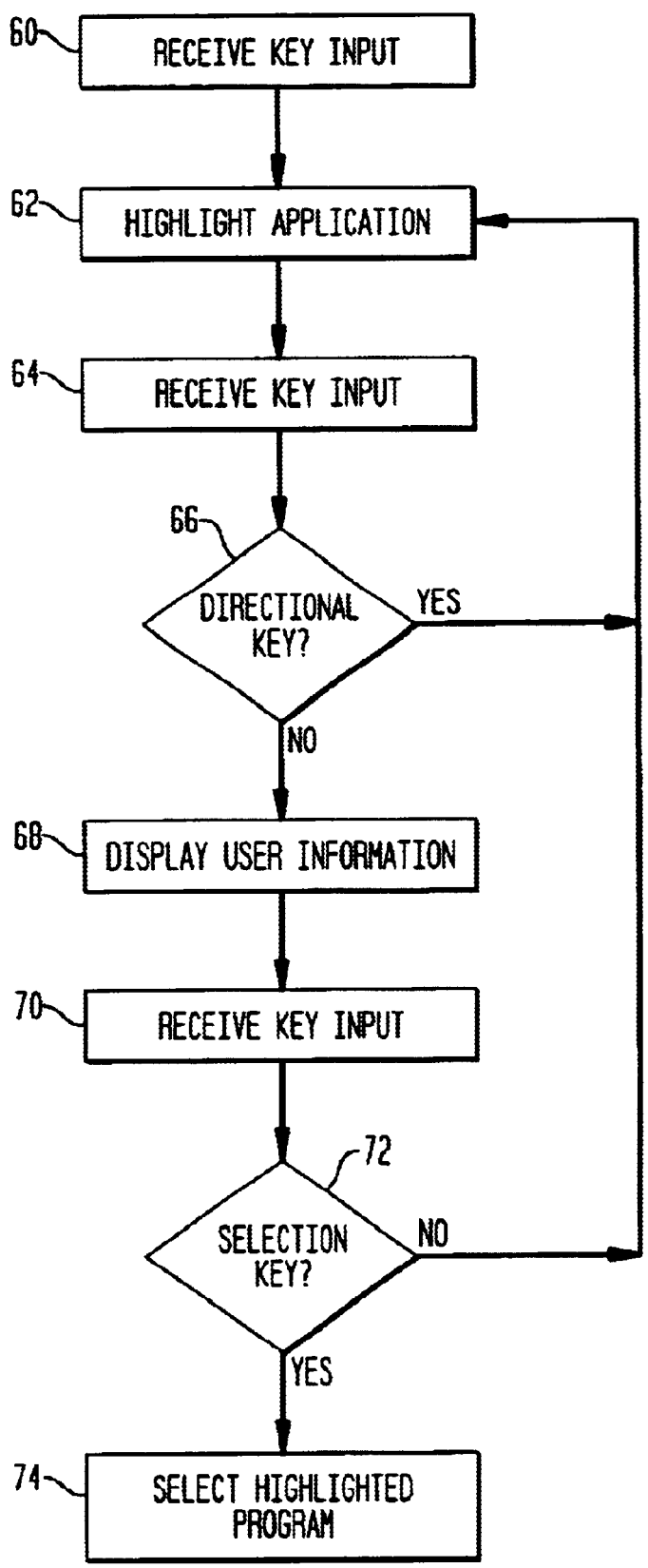
FIG. 4 is a flow diagram of a method for viewing user information associated with a loaded application program.

Once the application programs 30 and symbols 32 are loaded, the execution control program 26 controls the user's navigation among the displayed symbols, display of user information, and which application program 30 is launched or executed at a certain point in time as illustrated in FIG. 4.

Referring to FIG. 2, the input device 16 includes a set of directional keys 34 which are used as navigation inputs and a selection key 36 which will be explained in detail later herein. The display 12 as shown has 3 rows or lines, and are divided into 9 uniform logical blocks 13. Each block 13 is capable of displaying a symbol 32 associated with a loaded application program 30. Each symbol 32 stored in the memory 20 is preferably a graphic image of a logo associated with the application program although the symbol can be a name of the application or even a single letter. As shown, the display 12 is displaying four symbols "A", "B", "C" and "D" which represent the logos of entities that provide the four application programs 30 stored in the card 10. It is to be noted that while each block is shown in FIG. 2 as uniform in size, they can be of different sizes to allow one symbol to be more prominently displayed than the others.

FIG. 3 is a flow diagram of a method for loading and removing application programs, and displaying associated symbols on a display 12 of the smart card 10. The software code for the flow diagram of FIG. 3 is contained in the loader program 24. In step 40, the card 10 receives a request to either add or delete an application program 30. The request is generally transmitted by an external system in communication with the processor 18 through the interface 14 and is received by the loader program 24. In step 42, it is determined whether the request was an add request. If yes, control passes to step 44 where the application program 30 is received by the card 10 and stored in the memory 20. In step 46, the card receives a symbol 32 associated with the application program that was just received in step 44. Preferably, the symbol 32 is in a graphic file format suitable for display in the display 12. The symbol 32 may be a logo of an entity that provides the application program 30. For example, if the application provides a prepaid telephone transaction service, the symbol 32 may be a logo of the telephone service provider.

If it was determined that the request was not an add request, control passes to step 48 and it is assumed that the request was a delete request. In step 47, the loader program 24 receives a program identifier that identifies which application program to delete. In step 48, a selected application program identified in step 47 is deleted from the memory 20. In step 50, the associated symbol is also deleted from the memory 20.

In step 52, the loader program 24 determines whether there are more requests from the external system. If yes, control passes to step 40 and the above steps are repeated. If no more requests are pending, the program 24 continues with step 54. In step 54, the display locations of the currently stored symbols 32 are determined. While step 54 is performed by the smart card processor 18, it can be alternatively performed by the external system (not shown) prior to step 40.

There are many methods by which the display locations can be determined. Some possibilities include random placements, alphabetically arranged placements and sequential placements in the order the programs are received by the smart card 10. Alternatively, the display locations can be predetermined based on premiums paid to the card issuer by providers of the application programs 30. Optionally, the size of the symbols 32 can be varied, for example, according to the program usage with the most frequently used one having a larger size. Preferably, once the card is in use, the display locations can be determined based on usage of the application programs 30 with the most frequently used programs' symbols appearing first on the display 12 or more prominently than other symbols. Alternatively or in addition to such a method based on frequent usage, the symbol for the last used application program can be displayed first or more prominently than other symbols in the display 12.

Once the display locations have been determined, in step 56, the symbols 32 are retrieved from the memory 20 and displayed in the display 12 according to the determined locations. According to the principles of the present invention, the display 12 always reflects all currently loaded applications. As can be appreciated, the user now has the benefit of being able to see what applications are currently available at all times, even if the user holds multiple multi-application cards.

FIG. 4 is a flow diagram of a method for viewing user information associated with any loaded application program which illustrates further advantages of the present invention. The software code for the flow diagram of FIG. 4 is contained in the execution control program 26. In step 60, the card 10 receives any one of the key inputs 34, 36 which indicates that the user wishes to turn on or "activate" the card 10. In response, the execution control program 26 in step 62 highlights (for example using a reverse video, underlining, or the like) the first displayed symbol or the last used symbol to acknowledge that the card 10 has been "turned on". In step 64, the program 26 receives another key input from the user. In step 66, it is determined whether the key input is a directional key 34. If yes, control passes to step 62 where an appropriate symbol is highlighted. For example, if symbol "A" had been highlighted when a right directional key 34 is pressed, then symbol "B" would be highlighted in step 62.

If the decision is no in step 66, the program 26 assumes that the selection key 36 has been pressed and continues at step 68. At step 68, user information associated with the selected application program is displayed. The types of user information varies with the application programs 30. For example, if the program 30 is a prepaid telephone time application, one user information may be the number of minutes remaining in the application. As another example, if the program is a credit card account application, a user information may include the remaining amount of credit to be charged. As still another example, if the program is a prepaid video rental application, the user information may include the number of remaining rentals available for consumption and the number of rentals that have been consumed by the user.

In an alternative embodiment, the user information is automatically displayed as the user is navigating among the displayed symbols without the use of the selection key 36.

In another alternative embodiment, the input device 16 consists of a single key which, when pressed, will scroll through the displayed application symbols one at a time with each key input and automatically display the user information of each application as it scrolls.

In step 70, the card 10 receives another key input. In step 72, it is determined whether the received key input is a selection key. If no, control passes to step 62 where the control program 26 highlights the last selected symbol and awaits further input at step 64 from the user. If the received key input is the selection key, it is assumed that the user has selected and effectively locked in the currently highlighted application program for use at that time. In this way, it is a more secure method of using the smart card although it may be more convenient to let the external system select a particular application program in the card. In step 74, the highlighted program is selected for execution by the processor 18 and any request from the external system to run any other application program is rejected by the smart card 10.

From the foregoing, it will be appreciated that, although specific embodiments of the invention have been described herein for purposes of illustration, various modifications may be made without deviating from the spirit and scope of the invention. For example, while the smart card has been illustrated with only one processor, persons of ordinary skill in the art can appreciate that the card can have multiple processors that are segregated from each other to provide higher security. Accordingly, the present invention is not limited except as by the appended claims.

What is claimed is:

1. In an smart card having a memory and a processor for executing application programs stored in the memory, a method of identifying the stored application programs, the method comprising:

receiving in the smart card a plurality of application programs from an external system;

receiving in the smart card a plurality of symbols representing the plurality of application programs from the external system;

determining a plurality of display locations for the plurality of respective symbols once the smart card is in use, a first display location being reserved for one of the plurality of symbols associated with the most frequently used application program; and displaying on a display of the smart card the plurality of symbols according to the plurality of determined locations for identification of the plurality of application programs by a user.

2. The method according to claim 1, further comprising:

receiving a new application program and an associated new symbol;

determining a display location for the new symbol; and displaying the new symbol according to the determined location for the new symbol.

3. The method according to claim 2 wherein the step of determining includes changing the display location of at least one of the plurality of application programs.

4. The method according to claim 1, further comprising:

receiving a request to delete a selected application program from the smart card;

deleting from the smart card the selected application program and the associated symbol in response to the delete request; and determining the display locations for the remaining symbols.

5. The method according to claim 1, further comprising:

receiving a navigation input from the user; and highlighting a corresponding displayed symbol according to the received navigation input.

6. The method according to claim 5, further comprising:

receiving a selection input from the user; and selecting, for execution by a processor of the card, the application program corresponding to the highlighted symbol.

7. The method according to claim 5, further comprising:

receiving a selection input from the user, the selection input selecting one of the displayed symbols; and displaying user information associated with the application program corresponding to the selected symbol.

8. A method of identifying application programs stored in a multi-application smart card having a display, comprising:

receiving by the multi-application smart card a plurality of application programs, the plurality of application programs being executable by a processor of the smart card;

receiving by the smart card a plurality of symbols associated with the plurality of application programs;

determining a plurality of display locations for the plurality of symbols once the smart card is in use, a first display location being reserved for one of the plurality of symbols associated with the most frequently used application program; and displaying, on a display of the smart card for viewing by a user, the plurality of symbols according to the plurality of determined display locations.

9. The method according to claim 8, further comprising:

receiving a new application program and an associated new symbol;

determining a display location for the new symbol; and displaying the new symbol according to the determined location for the new symbol.

10. The method according to claim 8, further comprising:

receiving a navigation input from the user; and highlighting a corresponding displayed symbol according to the received navigation input.

11. The method according to claim 10, after the step of highlighting, further comprising:

receiving a selection input from the user, the selection input selecting one of the displayed symbols; and displaying user information associated with the application program corresponding to the selected symbol.

12. A smart card comprising:

a display;

a memory operable to store a plurality of application programs and a plurality of symbols representing the plurality of programs; and a processor coupled to the memory and the display, the processor being operable to execute the plurality of application programs, to determine the most frequently used application program and to display the plurality of associated symbols on the display for viewing by a user, a first display location on the display being reserved for one of the plurality of symbols associated with the most frequently used application program.

13. The smart card according to claim 12, further comprising:

a loader program stored in the memory and operable to receive a new application program and an associated new symbol, determine a display location for the new symbol, and display the new symbol according to the determined location.

14. The smart card according to claim 13 wherein when the display location for the new symbol is determined, the loader program changes the display location of at least one of the plurality of application programs.

15. The smart card according to claim 12, further comprising an input device coupled to the processor and operable to receive navigation inputs from the user for navigation among the displayed symbols.

16. The smart card according to claim 15 wherein the input device includes a plurality of directional keys and a selection key, the processor being operable to highlight a corresponding displayed symbol in response to the navigation input received through the directional keys, the processor being further operable to display user information associated with the application program corresponding to the highlighted symbol in response to activation of the selection key.

17. In an smart card having a memory and a processor for executing application programs stored in the memory, a method of identifying the stored application programs, the method comprising:

receiving in the smart card a plurality of application programs from an external system;

receiving in the smart card a plurality of symbols representing the plurality of application programs from the external system;

determining a plurality of display locations for the plurality of respective symbols once the smart card is in use;

determining how prominent at least one of the plurality of symbols is displayed, one of the plurality of symbols associated with the most frequently used application program being displayed more prominently than the other symbols; and displaying on a display of the smart card the plurality of received symbols according to the plurality of determined locations and determined prominence for identification of the plurality of application programs by a user.

18. The method as set forth in claim 17, wherein the one of the plurality of symbols associated with the most frequently used application program appears first on the display.

19. The method as set forth in claim 17, wherein the one of the plurality of symbols associated with the most frequently used application program has a larger size than the other symbols.

20. In an smart card having a memory and a processor for executing application programs stored in the memory, a method of identifying the stored application programs, the method comprising:

receiving in the smart card a plurality of application programs from an external system;

receiving in the smart card a plurality of symbols representing the plurality of application programs from the external system;

determining a plurality of display locations for the plurality of respective symbols;

determining how prominent at least one of the plurality of symbols is displayed, one of the plurality of symbols associated with the last used application program being displayed more prominently than the other symbols; and displaying on a display of the smart card the plurality of received symbols according to the plurality of determined locations and determined prominence for identification of the application programs by a user.

21. The method as set forth in claim 20, wherein the one of the plurality of symbols associated with the last used application program appears first on the display.

22. The method as set forth in claim 20, wherein the one of the plurality of symbols associated with the last used application program has a larger size than the other symbols.

23. In an smart card having a memory and a processor for executing application programs stored in the memory, a method of identifying the stored application programs, the method comprising:

receiving in the smart card a plurality of application programs from an external system;

receiving in the smart card a plurality of symbols representing the plurality of application programs from the external system;

determining a plurality of display locations for the plurality of respective symbols;

determining how prominent at least one of the plurality of symbols is displayed, one of the plurality of symbols associated with a provider of an application program paying a premium to an issuer of the smart card being more prominently displayed than the other symbols; and displaying on a display of the smart card the plurality of received symbols according to the plurality of determined locations and determined prominence for identification of the application programs by a user.

24. The method as set forth in claim 23, wherein the one of the plurality of symbols associated with the provider appears first on the display.

25. The method as set forth in claim 23, wherein the one of the plurality of symbols associated with the provider has a larger size than the other symbols.

26. In an smart card having a memory and a processor for executing application programs stored in the memory, a method of identifying the stored application programs, the method comprising:

receiving in the smart card a plurality of application programs from an external system;

receiving in the smart card a plurality of symbols representing the plurality of application programs from the external system;

determining a plurality of display locations for the plurality of respective symbols once the smart card is in use, a first display location being reserved for one of the plurality of symbols associated with the last used application program; and displaying on a display of the smart card the plurality of symbols according to the plurality of determined locations for identification of the plurality of application programs by a user.

27. In an smart card having a memory and a processor for executing application programs stored in the memory, a method of identifying the stored application programs, the method comprising:

receiving in the smart card a plurality of application programs from an external system;

receiving in the smart card a plurality of symbols representing the plurality of application programs from the external system;

determining a plurality of display locations for the plurality of respective symbols once the smart card is in use, a first display location being reserved for one of the plurality of symbols associated with a provider of one of the plurality of application programs paying a premium to an issuer of the smart card; and displaying on a display of the smart card the plurality of symbols according to the plurality of determined locations for identification of the plurality of application programs by a user.

28. A smart card comprising:

a display;

a memory operable to store a plurality of application programs and a plurality of symbols representing the plurality of programs; and a processor coupled to the memory and the display, the processor being operable to execute the plurality of application programs, to determine the last used application program and to display the plurality of associated symbols on the display for viewing by a user, a first display location on the display being reserved for one of the plurality of symbols associated with the last used application program.

29. A smart card comprising:

a display;

a memory operable to store a plurality of application programs and a plurality of symbols representing the plurality of programs; and a processor coupled to the memory and the display, the processor being operable to execute the plurality of application programs, to determine at least one of the most frequently used application program and the last used application program and to display the plurality of associated symbols on the display for viewing by a user, a first display location on the display being reserved for one of the plurality of symbols associated with a provider of one of the plurality of application programs paying a premium to an issuer of the smart card.

* * * * *